March 10, 1925. 1,528,802
J. A. THOMPSON
AUTOMOBILE TOOL AND LOCK
Filed July 2, 1921
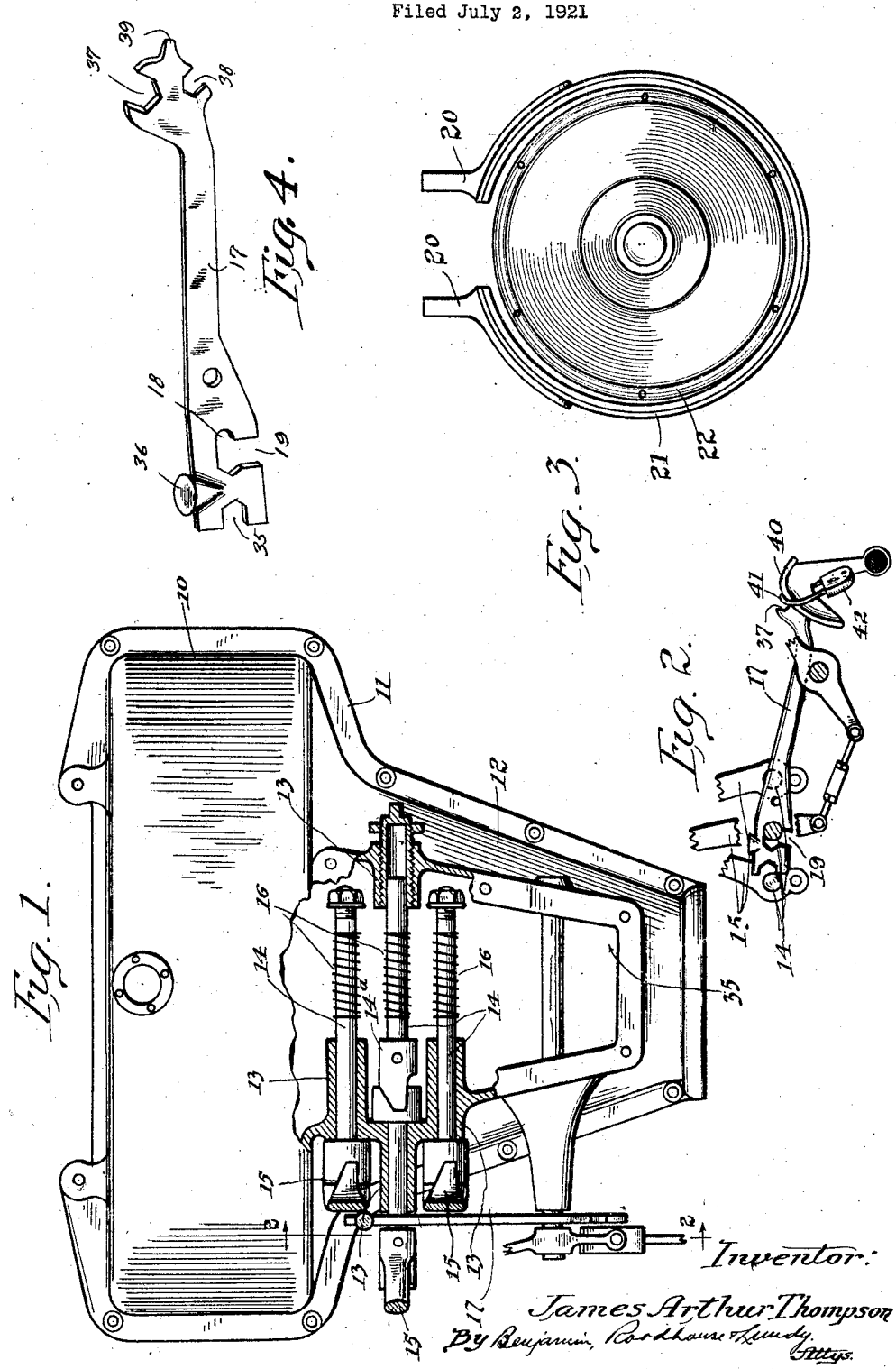
Inventor:
James Arthur Thompson
By Benjamin, Roadhouse & Lundy
Attys.

Patented Mar. 10, 1925.

1,528,802

UNITED STATES PATENT OFFICE.

JAMES ARTHUR THOMPSON, OF RUSHVILLE, ILLINOIS, ASSIGNOR TO GLADACRES INCORPORATED, A CORPORATION OF ILLINOIS.

AUTOMOBILE TOOL AND LOCK.

Application filed July 2, 1921. Serial No. 482,131.

*To all whom it may concern:*

Be it known that I, JAMES ARTHUR THOMPSON, a citizen of the United States, residing at Rushville, in the county of Schuyler and State of Illinois, have invented a new and useful Improvement in Automobile Tools and Locks, of which the following is a specification.

My invention relates to tools and the like to be used in connection with an automobile or motor vehicle. More especially my invention has relation to a device to be employed in connection with the operating or control pedals of a transmission in a Ford automobile, and whereby such elements may be readily assembled in making replacements and repairs and in replacing the transmission cover. Such a device is so constructed that it may be employed also as a lock to prevent theft of the vehicle.

As is well known, the transmission of a Ford motor vehicle includes a plurality of drums surrounded by spring bands that are tightened upon their respective drums by means of spindles that are reciprocated longitudinally of their axes by means of their respective foot pedals. In disassembling or taking down the transmission the foot pedals and spindles, which are mounted and carried in a casing or cover for the transmission, are removed which releases the spring bands so that they open to their farthest extent. In assembling this structure great difficulty is also experienced in holding the three bands in a compressed manner while the spindles are being assembled therewith because the foot pedals and spindles being free will often rotate so as to be out of position for assembly with the transmission bands.

I have devised a handy tool that is so designed that it is adapted to be assembled with the spindles, pedals and the casing or shell so as to retain the pedals and their spindles against movement while the shell is being replaced over the transmission and the spindles assembled with their bands. Another object of my invention is to provide means in connection with the above mentioned structure whereby the pedals and their spindles may be locked against movement so that, although the motor may be started and running, the transmission is incapable of being operated so that the vehicle cannot be driven, and theft thereof prevented. I prefer to accomplish the divers objects in substantially the manner hereinafter described, and as more particularly pointed out in the claims, reference being now had to the accompanying drawings forming a part of this specification, and which, in a sense, are diagrammatic for the purpose of illustrating the principles involved.

In the drawings:

Figure 1 is a top plan of the casing or shell removed showing the use of my tool in conjunction with the foot pedals.

Figure 2 is a side view of the pedal engaging element of the tool illustrating the manner of locking the vehicle.

Figure 3 is an end view of the bands on the transmission released.

Figure 4 is a perspective of the tool element for use in connection with the pedals and spindles.

Referring more particularly to Figures 1, 2 and 3 of the drawings, 10 indicates the shell or casing usually employed upon a Ford motor car and enclosing the fly-wheel and transmission, and, which, as shown, is provided with a peripheral flange 11 for securing the shell in position. In an extension 12 of this shell are a plurality of bearings 13 in which suitable spindles 14 are journaled. These spindles extend outside their bearings at one end, and, as shown at at left of Figure 1, they are each provided with foot pedals 15, the shanks only whereof are shown in the drawings. The portions of the spindles within shell extension 12 are surrounded by coil-springs 16 for co-operating with the transmission bands, and the central or intermediate spindle has its respective pedal mounted upon its outer end a short distance beyond the respective bearing in the casing.

When shell 10 has been removed from the frame of the vehicle and is about to be again assembled therewith, the pedals, owing to their being disconnected from the transmission, are free to swing, and in order to prevent this swinging, I have provided the bar 17, illustrated in detail in Figure 3. This bar, intermediate its ends, is provided with a recess 19 cut inwardly from one of its longitudinal edges, which recess has an offset or lateral portion 18. The bar is positioned with the spindle 14 in the recess, and is moved longitudinally to fit the spindle into the offset 18, and then rotated upon spindle 14 by moving the longer end downwardly which causes the opposite or shorter end to press against the adjacent (reverse) lever 15 which is slightly deflected outwardly, thus causing a wedging of the bar 17 into a position so that the longer end thereof is in front of the end of the other (brake) spindle 15 and blocks the movements of any or all of the spindles and their connecting levers or foot pedals. In this connection, it may be stated that the intermediate spindle in making its rotation retracts into the casing through the action of the cam mechanism 14ª and bar 17 being fitted between the pedal and the bearing on the intermediate spindle 14 prevents this inwardly movement, and, consequently, the rotation of the pedal. The other pedals and their respective spindles move outwardly when rotated and bar 17 prevents this outward movement thereof.

In the portion of the tool element 17 adjacent recess 18—19, I have provided a nut engaging recess 35 of semi-hexagonal shape and an enlargement 36 in the form of a hammer head. The opposite end of element 17 is slightly enlarged and therein I have provided substantially oppositely disposed semi-hexagonal recesses 37 and 38, while between these latter recesses is a tapered screw driver blade 39. I prefer to make recesses 35, 37 and 38 of different dimensions to permit of their use upon nuts of divers sizes, and I also utilize recesses 37 and 38 in locking the vehicle. As seen at the extreme left in Figure 1 and in Figure 2, recesses 37 and 38 (when the tool is in use) are adjacent the high speed cam 40 of the Ford mechanism so that all the owner needs to do to lock the mechanism is to pass the bail 41 of a padlock 42 around cam 40 so that bail 41 will straddle the tool in recesses 37 and 38. This prevents the tool being moved horizontally far enough to disengage the intermediate spindle 14 from offset 18 of recess 19, and thereby prevents the operation of the transmission system. The slot 18—19 being of substantially L-shape the bar cannot be raised vertically of the intermediate spindle 14 until the bar has been shifted longitudinally far enough to permit the passage of the spindle through portion 19 of the slot. This makes it impossible for unauthorized persons to drive the vehicle because of the fact that although they may be able to start the engine they cannot operate the foot pedals to manipulate the transmission. It will be understood slot 18—19 may be made oblique to the edge of bar 17 and accomplished the same function as though made L-shaped, or slot 35 may be extended longitudinally to connect with slot 18 to perform the same function, it being understood the slot 19 would then be omitted.

What I claim new is:

1. A tool for use in connection with the three foot pedals of a Ford motor car, comprising an elongated bar having a recess in one of its longitudinal edges the inner portion of said recess being enlarged whereby said bar is adapted to straddle the spindle of the intermediate pedal and move bodily in a longitudinal direction and the portions of said bar on each side of said recess are positioned in front of and abutting the outer ends of the other pedals, and thereby prevent movement of all of said pedals.

2. A tool of the kind described for use in connection with the foot pedals and high-speed cam of a Ford motor car, comprising an elongated bar having a recess in one edge the inner end of which recess is to one side of the entrance opening, said recess adapted to straddle the spindle of one of said foot pedals and abut the spindles of the other whereby movement of said pedals is prevented; the opposite end of said bar constructed to receive a padlock to lock the same to said high speed cam.

3. A tool of the kind described for use in connection with the foot pedals and high-speed cam of a Ford motor car, comprising an elongated bar having means at one end to co-act the same with said foot pedals and prevent operation thereof, and said bar having means at its opposite end to receive a padlock whereby said bar, pedals and cam are locked against movement.

Signed at Rushville, county of Schuyler and State of Illinois, this 14th day of March, 1921.

JAMES ARTHUR THOMPSON.